US007631430B2

(12) United States Patent
Chang

(10) Patent No.: US 7,631,430 B2
(45) Date of Patent: Dec. 15, 2009

(54) GUIDE BAR FOR A CHAIN SAW

(76) Inventor: Li-Shua Chang, No. 169, Meiting St., North District, Taichung City 404 (TW)

( * ) Notice: Subject to any disclaimer, the term of this patent is extended or adjusted under 35 U.S.C. 154(b) by 0 days.

(21) Appl. No.: 11/699,829

(22) Filed: Jan. 29, 2007

(65) Prior Publication Data

US 2008/0178478 A1 Jul. 31, 2008

(51) Int. Cl.
*B23D 57/02* (2006.01)

(52) U.S. Cl. .............................. 30/381; 30/383; 30/385

(58) Field of Classification Search ................... 30/381, 30/385, 386, 387, 383, 384; 83/788, 792, 83/820
See application file for complete search history.

(56) References Cited

U.S. PATENT DOCUMENTS

| | | | | |
|---|---|---|---|---|
| 4,819,332 | A * | 4/1989 | Sugihara et al. | 30/123.4 |
| 4,825,553 | A * | 5/1989 | Bruccheri | 30/383 |
| 4,858,325 | A * | 8/1989 | Miller | 30/373 |
| 4,961,263 | A * | 10/1990 | Apfel et al. | 30/387 |
| 5,035,058 | A * | 7/1991 | Date et al. | 30/387 |
| 5,249,363 | A * | 10/1993 | Mitrega et al. | 30/387 |
| 5,271,157 | A * | 12/1993 | Wieninger et al. | 30/387 |
| 5,884,406 | A * | 3/1999 | Leini | 30/387 |
| 6,111,837 | A * | 8/2000 | Watanabe et al. | 720/601 |
| 6,536,119 | B1 * | 3/2003 | Carr | 30/371 |
| 6,698,101 | B2 * | 3/2004 | Chen | 30/387 |

* cited by examiner

*Primary Examiner*—Boyer D Ashley
*Assistant Examiner*—Omar Flores-Sánchez
(74) *Attorney, Agent, or Firm*—Alan Kamrath; Kamrath & Associates PA

(57) ABSTRACT

A guide bar for a chain saw includes a first guide plate, a second guide plate and a spacer plate which is sandwiched between the first and second guide plates. Each of the first and second guide plates has a plurality of protrusions extending from an outer side thereof and recesses defined in an inner side thereof. A groove is defined along an outer periphery of the spacer plate and located between the first and second guide plates so as to receive the chain. The protrusions and recesses reinforce the structural strength of the guide bar and reduce the friction between the guide bar and the object to be cut.

5 Claims, 6 Drawing Sheets

GUIDE BAR FOR A CHAIN SAW

FIELD OF THE INVENTION

The present invention relates to a guide bar for a chain saw, wherein the guide bar includes a plurality of protrusions and recesses on two guide plates so as to reinforce the structure of the guide bar.

BACKGROUND OF THE INVENTION

A chain saw includes a motor and a guide bar which includes two guide plates and a spacer plate which is sandwiched between the two guide plates. The guide bar usually is made by metal, and a groove is defined along a periphery of the guide bar so as to receive the chain therein.

A conventional guide bar 60 of a chain saw is shown in FIG. 5 and generally includes two guide plates 62 and a spacer plate 61 which is sandwiched between the two guide plates 62. The spacer plate 61 is shorter than the guide plates 62 so as to form a groove 63 which is defined along the guide bar 60. The chain 70 is connected to the guide bar 60 and movable in the slot 63. When cutting objects, the chain 70 shakes and hits the guide plates 62, and the shocks are transferred to the whole chain saw. Considerable noise is generated due to the vibration of the chain 70 and the guide bar 60.

Another conventional guide bar 80 is disclosed in FIG. 6 and includes two guide plates 82 and a spacer plate 81 which is sandwiched between the two guide plates 82. The spacer plate 81 is shorter than the guide plates 82 so as to form a groove 83 which is defined along the guide bar 80 so as to receive the chain 90 therein. The spacer plate 81 has a first through hole 811, and each of the two guide plates 82 has a second through hole 821 which communicates with the first through hole 811. Vibration can be reduced when it is transferred to the first and second through holes 811, 821 so as to reduce shaking. However, the first and second through holes 811, 821 reduce the strength of the guide bar 80. Besides, when the chain saw cuts a thick object, the object contacts the guide bar 80. Since the guide plates 82 have flat outer surfaces, the friction between the object and the guide bar 80 increases and affects the cuffing efficiency. Once the guide plates 82 are worn out, the whole guide bar has to be replaced.

The present invention provides a guide bar for a chain saws wherein each of the guide plates of the guide bar includes multiple protrusions on the outer side and recesses in the inner side so as to reinforce structural strength of the guide bar and reduces the friction between the guide bar and the object to be cut.

SUMMARY OF THE INVENTION

The present invention relates to a guide bar for chain saws. The guide bar includes a first guide plate having a plurality of first protrusions extending from an outer side thereof, a second guide plate having a plurality of second protrusions extending from an outer side thereof, and a spacer plate which is sandwiched between the first and second guide plates. A groove is defined along an outer periphery of the spacer plate and located between the first and second guide plates.

The primary object of the present invention is to provide a guide bar of a chain saw wherein the two guide plates each have protrusions on the outer side thereof to provide better structural strength of the guide bar and less friction between the guide bar and the object to be cut.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 4:
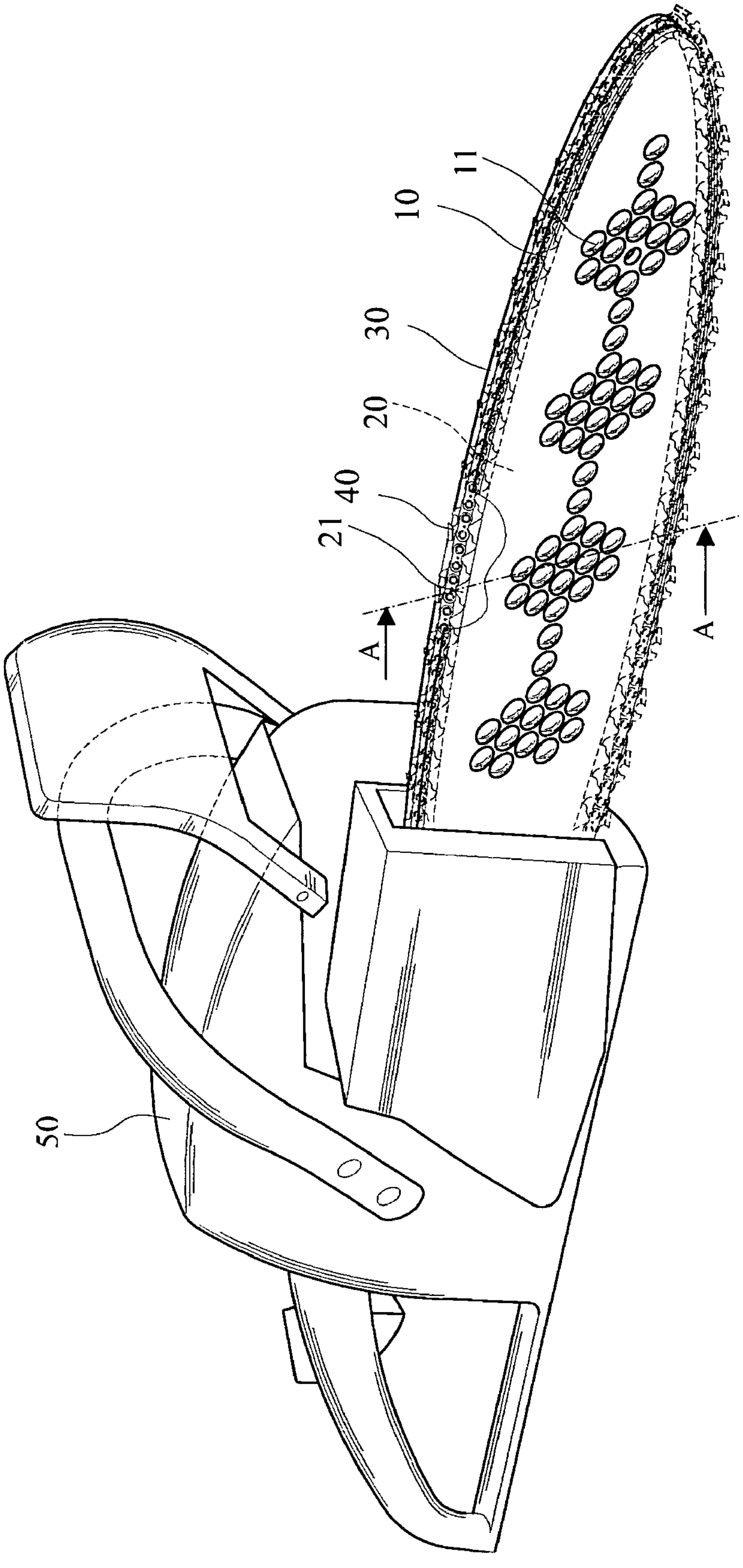
FIG. 4 shows the guide bar of the present invention used with a chain saw.
Figure 5:
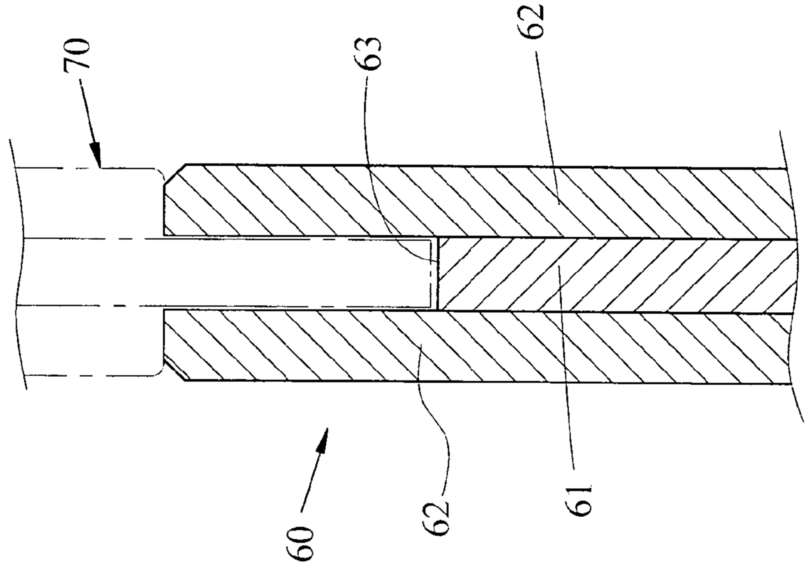
FIG.5 PRIOR ART
FIG. 5 is a cross sectional view to show a conventional guide bar.
Figure 6:
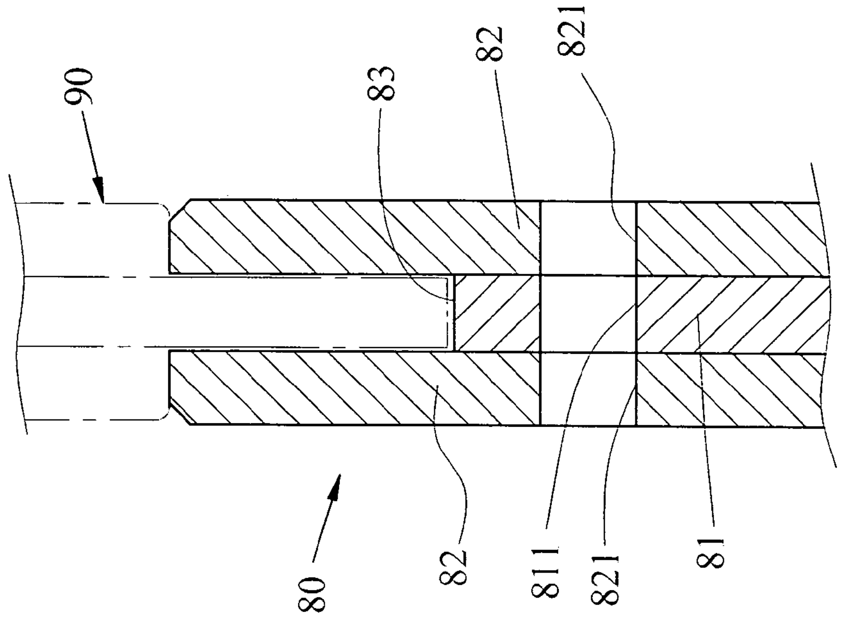
FIG.6 PRIOR ART
FIG. 6 is a cross sectional view to show another conventional guide bar.

Referring to FIG. 4, the guide bar 1 of the present invention is connected to a chain saw 50, and a chain 40 is engaged with the guide bar 1.

Figure 1:
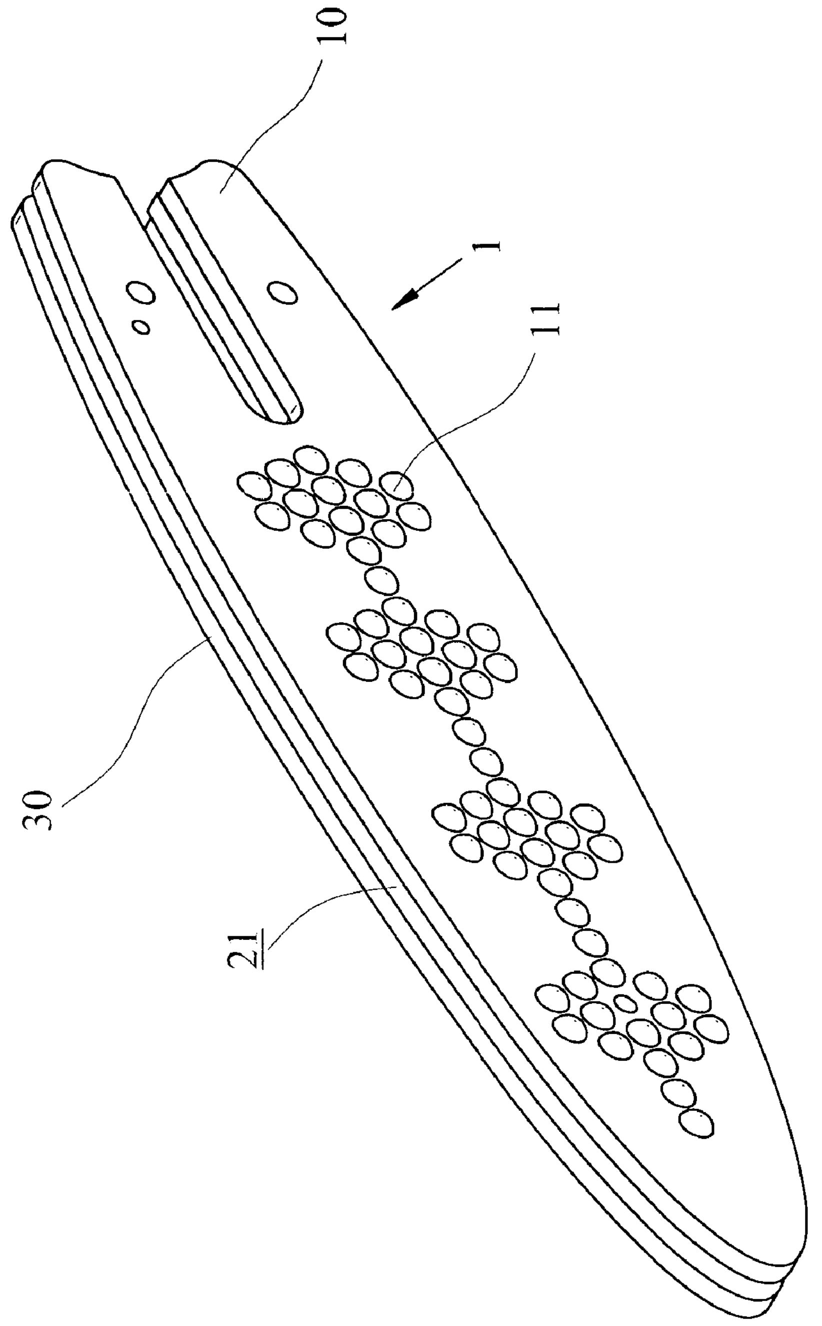
FIG. 1 is a perspective view to show the guide bar of the present invention.
Figure 2:
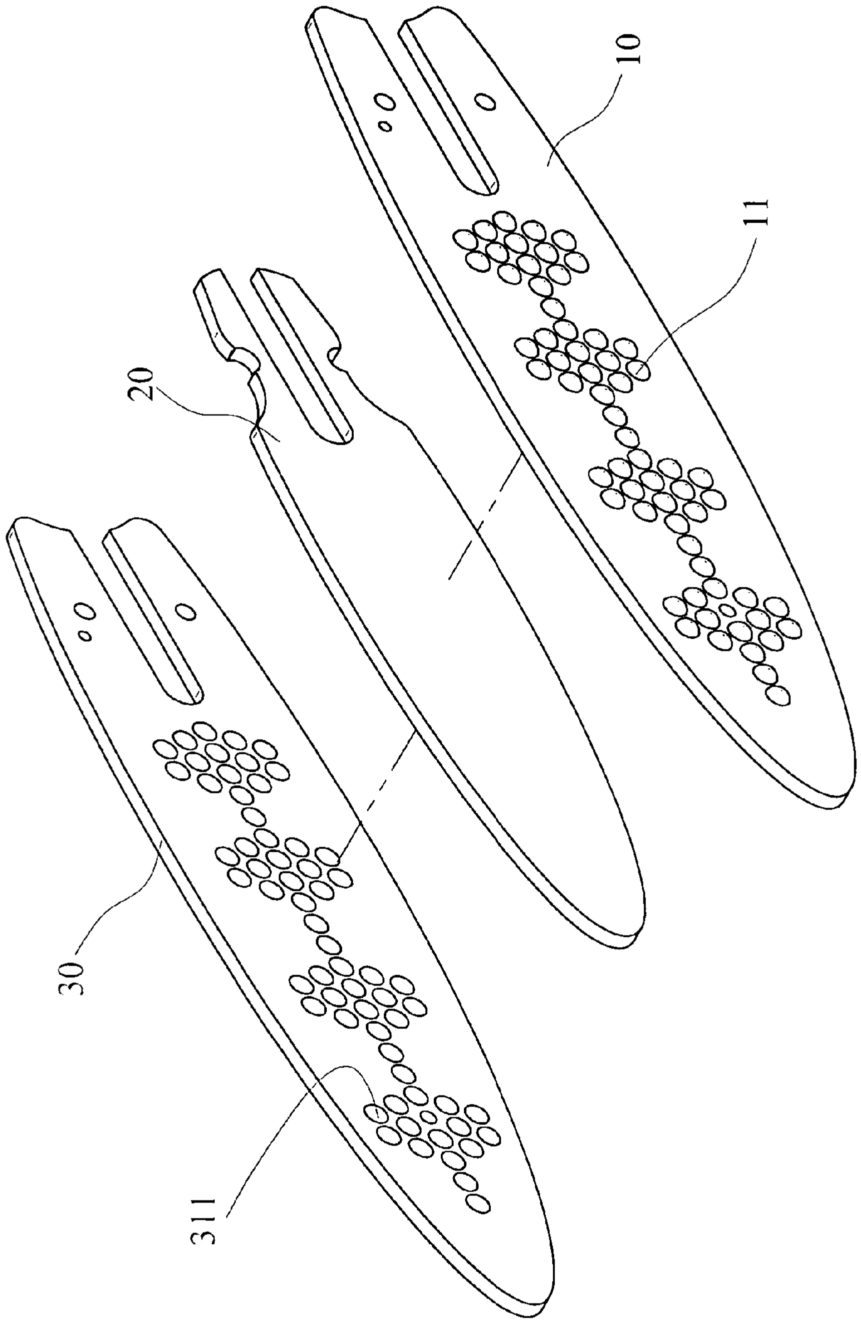
FIG. 2 is an exploded view to show the guide bar of the present invention.
Figure 3:
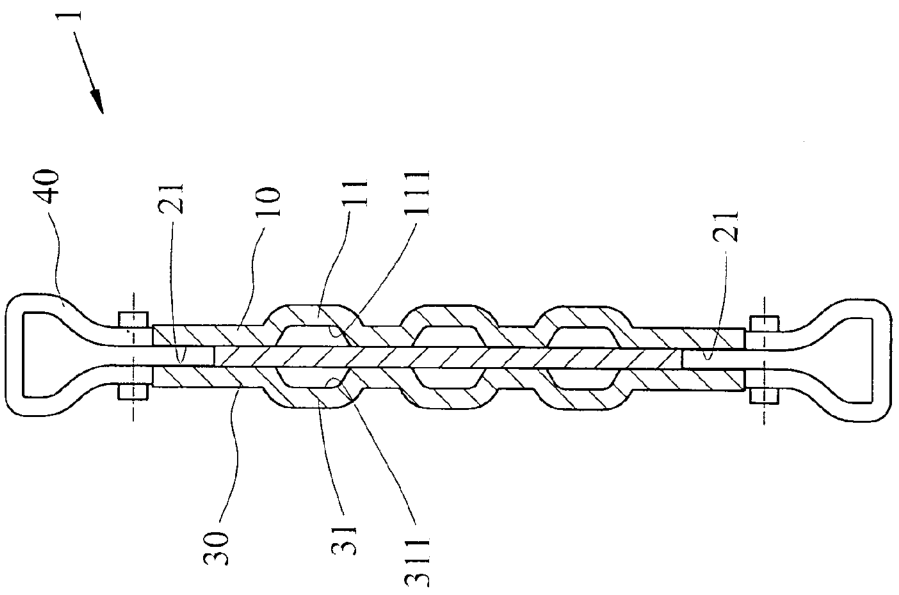
FIG. 3 is a cross sectional view along line A-A in FIG. 4 to show the guide bar of the present invention.

Referring to FIGS. 1 to 3, the guide bar 1 of the present invention includes a first guide plate 10, a second guide plate 30 and a spacer plate 20. The first guide plate 10 has a plurality of first protrusions 11 extending from an outer side thereof, and a plurality of first recesses 111 are defined in an inner side thereof. The first recesses 111 are located corresponding to the first protrusions 11. The second guide plate 30 has a plurality of second protrusions 31 extending from an outer side thereof, and a plurality of second recesses 311 are defined in an inner side thereof. The second recesses 311 are located corresponding to the second protrusions 31. The first and second protrusions 11, 31 are located symmetrically relative to the spacer plate 20. The spacer plate 20 is sandwiched between the first and second guide plates 10, 30. A groove 21 is defined along an outer periphery of the spacer plate 20 and located between the first and second guide plates 10, 30 so as to receive the chain 40. The first and second guide plates 10, 30 are connected with each other by welding, riveting or any known method.

The first protrusions 11 and the second protrusions 31 project from the outer sides of the first and second guide plates 10, 30. Thus, when the chain saw 50 is cutting a bulky object, only the first and second protrusions 11, 31 contact the object such that only limited friction occurs between the guide bar 1 and the object. Further, the first protrusions 11 and recesses 111 and the second protrusions 31 and recesses 311 reinforce the structural strength of the first and second guide plates 10, 30. The shocks or vibration can be shared by the protrusions 11, 31 and recesses 111, 311 by slight deformation to reduce shaking while using the chain saw 50.

The first and second protrusions 11, 31 and the first and second recesses 111 and recesses 311 can be arranged in any known pattern or shapes. In this embodiment, the first and second protrusions 11, 31 are curved protrusions. The first and second protrusions 11, 31 can also be elongated ridges or different sizes and shapes.

Although the embodiment in accordance with the present invention has been shown and described, it should be clear to those skilled in the art that further embodiments may be made without departing from the scope of the present invention.

What is claimed is:

1. A guide bar for chain saws, comprising:

a first guide plate having a plurality of first protrusions integrally extending from an outer side thereof, with the first guide plate and the plurality of first protrusions formed as a single piece;

a second guide plate having a plurality of second protrusions extending from an outer side thereof, with the second guide plate and the plurality of second protrusions formed as a single piece; and a spacer plate sandwiched between the first and second guide plates, with a groove defined along an outer periphery of the spacer plate and located between the first and second guide plates, wherein the first guide plate has a plurality of first recesses defined in an inner side thereof and the plurality of first recesses are located corresponding to and within the plurality of first protrusions, wherein the second guide plate has a plurality of second recesses defined in an inner side thereof and the plurality of second recesses are located corresponding to and within the plurality of second protrusions.

2. The guide bar as claimed in claim 1, wherein the pluralities of first and second protrusions are curved protrusions.

3. The guide bar as claimed in claim 1, wherein the pluralities of first and second protrusions are located symmetrically on opposite sides of the spacer plate.

4. The guide bar as claimed in claim 1, wherein the plurality of first recesses are located corresponding to the plurality of second recesses.

5. The guide bar as claimed in claim 1, wherein the plurality of first protrusions are located corresponding to the plurality of second protrusions.

* * * * *